July 29, 1969 E. T. CALKIN ET AL 3,458,711
DYNAMIC VOLTAGE BALANCING CIRCUIT
Filed Aug. 10, 1967

INVENTORS E. T. CALKIN
J. W. IANNIELLO
BY R. B. Austin
ATTORNEY

United States Patent Office 3,458,711
Patented July 29, 1969

3,458,711
DYNAMIC VOLTAGE BALANCING CIRCUIT
Edwin T. Calkin, Parsippany, and Joseph W. Ianniello, Morristown, N.J., assignors to Bell Telephone Laboratories, Incorporated, Berkeley Heights, N.J., a corporation of New York
Filed Aug. 10, 1967, Ser. No. 659,685
Int. Cl. H02j *1/14*
U.S. Cl. 307—36 4 Claims

ABSTRACT OF THE DISCLOSURE

A controllable variable impedance is connected in parallel with each one of several loads which have varying load impedances and which are connected in series across a D.C. source. Each one of the variable impedances derives a reference voltage from a high impedance divider network, whereby a predetermined voltage ratio is established across the serially connected loads. As one or the other of the loads changes its load impedance, and consequently its current requirement, the conductivity of at least one of the variable impedances is changed to compensate for the change in load current, thereby maintaining the predetermined voltage ratio across the loads.

Background of the invention

The invention relates generally to voltage control circuits and, more specifically, to dynamic voltage balancing circuits which maintain a constant voltage ratio across serially connected variable impedance loads.

In certain circuit applications, as for instance in conjunction with transistors having limited voltage ratings, it may be necessary that an aplied D.C. voltage divide evenly or in some other predetermined proportion across serially connected loads in order to avoid, for example, excessive load voltages or currents. In order to achieve these results during dynamic operating conditions it has heretofore generally been necessary to employ complex and inefficient circuit arrangements.

A primary object of the inventio nis to simplify dynamic voltage balancing circuits.

Another object of the invention is to increase the efficiency of dynamic voltage balancing circuits.

Summary of the invention

To fulfill these objects of the invention a variable impedance is connected in parallel with each one of several loads which are connected in series across a D.C. source. A high impedance divider network furnishes a reference voltage to each one of the variable impedances to establish a predetermined voltage ratio across the loads. As one or the other of the loads changes its load impedance, and consequently its current load, the conductivity of at least one of the variable impedances is changed to compensate for the change in load current to maintain the predetermined voltage ratio across the loads.

More specifically, in one embodiment of the invention accurate and stable dynamic voltage balancing is obtained by using two serially connected complementary Darlington transistor pairs as the controllable variable impedances in parallel with two serially connected loads having variable load impedances. The emitter electrodes of the Darlington pairs are connected together and to the juncture of the loads, while the base electrodes of the Darlington pairs are connected together and to a common reference voltage on a high impedance divider network which is also connected across the D.C. source. The reference voltage provides the biasing for the Darlington transistor pairs and, consequently, establishes the voltage ratio across the serially connected load impedances.

The noteworthy feature of the invention is the fixed voltage ratio across the serially connected loads independent of load current requirements or load current changes of the individual loads. Since the excess current of one load is absorbed by the output transistor of one of the Darlington transistor pairs, the voltages across the individual loads are determined solely by the divider network ratio, even though one load may draw considerably more current than the other.

Detailed description

Figure 1:
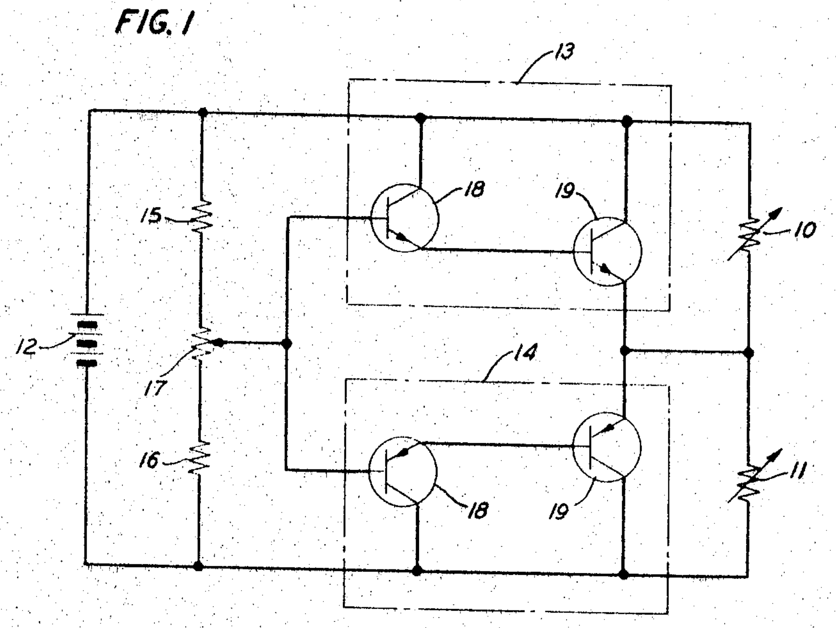
FIG. 1 is a schematic diagram of a dynamic voltage balancing circuit which utilizes two serially connected complementary Darlington transistor pairs as the controllable variable impedances in parallel with two serially connected load impedances.

The dynamic voltage balancing circuit illustrated in FIG. 1 provides for a constant voltage ratio across two load impedances 10 and 11 which are connected in series across D.C. source 12. Each one of the loads 10 and 11 has one of variable impedances 13 and 14, respectively, connected in parallel with it. Fixed resistors 15 and 16 and variable resistor 17 are connected in series across D.C. source 12 to form a high impedance divider network. The movable arm of variable resistor 17 is connected to that input of variable impedances 13 and 14 and serves as a variable reference voltage input.

Variable impedances 13 and 14 are two complementary Darlington pairs each comprising transistors 18 and 19, where the transistors of variable impedance 13 are n-p-n transistors while the transistors of variable impedance 14 are p-n-p transistors. The emitter electrodes of transistors 19 of the respective variable impedances 13 and 14 are connected together and to the juncture of loads 10 and 11, while the emitter electrodes of respective transistors 18 are connected to the base electrodes of respective transistors 19. The base electrodes of transistors 18 of variable impedances 13 and 14, on the other hand, are connected together and to the movable arm of variable resistor 17. The collector electrodes of transistors 18 and 19 of variable impedances 13 and 14 are connected together and to the positive and negative terminal, respectively, of D.C. source 12.

In the operation of the dynamic voltage balancing circuit of FIG. 1, variable resistors 10 and 11 represent two loads which are connected to D.C. source 12. The load impedances of loads 10 and 11 may during normal operating conditions change independently of each other, thereby changing the composite load current drawn from D.C. source 12. Unless special circuitry is used in conjunction with the loads, they cannot independently change their load currents or disproportionately change their load impedances without causing a change in the voltage distribution across the loads. Variable impedances 13 and 14, in conjunction with the divider resistors 15, 16, and 17, comprise circuitry which provides for effective and economic dynamic voltage balancing across the loads. That is, a predetermined voltage ratio may be maintained across loads 10 and 11 even though the individual loads change their load impedances continuously and independently of each other.

In the operation of the dynamic voltage balancing circuit of FIG. 1 variable impedances 13 and 14 stabilize the voltages across loads 10 and 11 by absorbing any excess current which is drawn as a result of any impedance changes of the loads. The initial voltage ratio across the loads is determined by the reference voltage obtained from the movable contact of variable resistor 17 of the divider network.

In order to illustrate the operation of the dynamic voltage balancing circuit, loads 10 and 11 are initially assumed to have equal load impedances and the movable contact of the variable resistor 17 of the divider network is set at the half-way mark. As a result, the voltages at the juncture of the base electrodes of transistors 18 and the juncture of the emitter electrodes of transistors 19 have the same value and are eqaul to one-half of the voltage of D.C. source 12. Consequently, the voltages across the base-emitter junctions of transistors 18 and 19 of variable impedances 13 and 14 are equal to zero, so that both variable impedances 13 and 14 are cut off and are therefore nonconducting.

As long as the impedances of loads 10 and 11 remain equal or maintain a constant impedance ratio with respect to each other, no problem arises and the voltage ratio across loads 10 and 11 remains constant. When the impedance of one of the loads 10 and 11 changes with respect to the impedance of the other load, however, the resulting change in load current drawn from the source tends to change the predetermined voltage ratio across the loads.

If it is assumed, for instance, that the impedance of load 10 decreases while the impedance of load 11 remains constant, the composite load current increases, thereby tending to increase the voltage across load 11. Since the voltage at the movable arm of resistor 17 remains constant, however, a slight increase of the voltage across load 11 establishes a forward bias across the base-emitter junction of transistors 18 and 19 of variable impedance 14. As a result transistors 18 and 19 start to conduct, thereby establishing a current bypass path across load 11 which, in turn, tends to maintain the voltage across load 11 constant.

The continuous and automatic current compensation of variable impedance 14 is made possible by the action of the Darlington pair or compound-connected transistors 18 and 19. The Darlington pair comprising transistors 18 and 19 functions in a manner well known in the art is discussed more particularly in Section 13–8 of the book on "Semiconductor Devices and Application" by R. A. Greiner which was published by McGraw-Hill in 1961.

In operation of the voltage balancing circuit, transistor 19 of variable impedance 14 serves as a current bypass transistor, while transistor 18 provides the required drive for transistor 19. As the voltage across load 11 tends to increase, the forward bias on the Darlington pair of variable impedance 14 is increased. Consequently, transistor 19 conducts more heavily, thereby diverting more current from load 11. This reduction in current through load 11, in turn, tends to reduce the voltage across the load, thereby reducing the forward bias across the Darlington pair. The voltage across load 11 and the forward bias on the Darlington pair will reach a state of equilibrium at which point the current which is bypassed is of such an amplitude as to maintain the voltage across load 11 at its predetermined level. As load 10 continues to change its load impedance, and consequently its load current, the conductivity of variable impedance 14 is also continuously and automatically changed to compensate for the variation of load current, thereby maintaining the voltage across loads 10 and 11 constant.

When, on the other hand, the load impedance of load 10 increases while the impedance of load 11 remains constant, the voltage across load 10 tends to increase, thereby forward biasing variable impedance 13. As a result, transistors 18 and 19 of variable impedance 13 start to conduct to bypass the excess current past load 10, thereby stabilizing the voltage ratio across loads 10 and 11.

Identical voltage balancing effects are obtained when the load impedance of load 11 changes while the load impedance of load 10 remains constant. Similarly, when both loads change their impedances at an unequal rate to produce an impedance ratio other than the initial ratio, the voltage balancing circuit preserves the predetermined voltage ratio across the loads by automatically varying the current bypass capacity of the individual variable impedance networks.

In the operation of the variable impedance the voltage between the movable contact of resistor 17 and the juncture of loads 10 and 11 determine the bias on both variable impedances 13 and 14. Since the reference voltage of the movable contact of resistor 17 is constant, the bias voltage applied to the variable impedances is a function only of the voltage at the juncture of loads 10 and 11; that is, as the voltage ratio across the loads changes due to some change in load impedances, the voltage at the juncture of the loads changes correspondingly, thereby initiating the voltage balancing action of the circuit.

The initial voltage ratio across the loads need not be 1:1, in which case the movable contact of resistor 17 is adjusted to the proper voltage level to obtain the required voltage ratio across the loads. Similarly, the current through loads 10 and 11 need not initially be equal. When such initial load current unbalance exists variable resistor 17 still determines the voltage ratio across the loads. However, one or the other of variable impedances 13 and 14 is initially conducting to bypass the excess current of the high current load past the low current load. As the load impedances further change during the operation of the circuit, the biasing on the Darlington pairs of variable impedances 13 and 14 is continuously varied to accommodate the varying current requirements of the loads. As a result, the voltage ratio across loads 10 and 11 is continuously and automatically maintained at the ratio determined by the setting of variable resistor 17, irrespective of individual load impedance changes.

Figure 2:
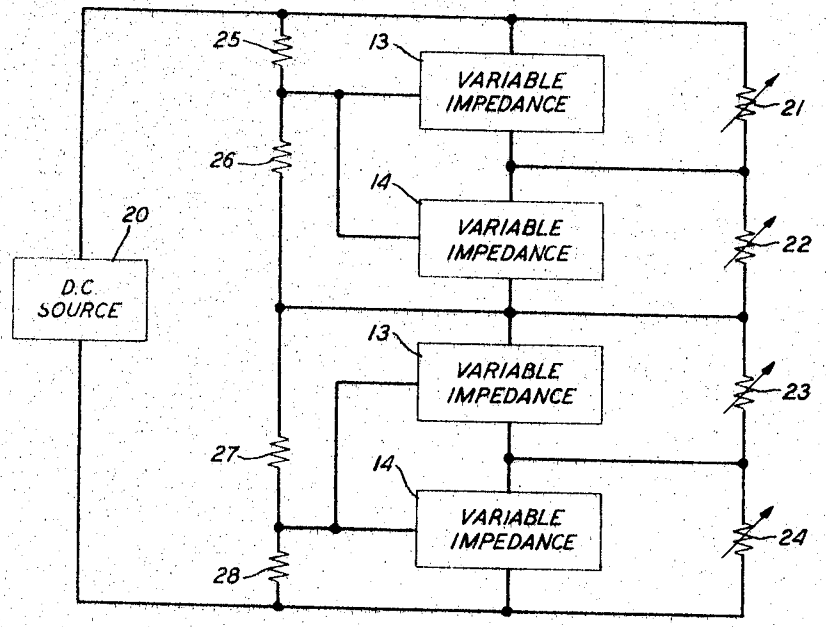
FIG. 2 is a block diagram of a dynamic voltage balancing circuit which maintains a constant voltage ratio across several serially connected loads having variable load impedances.

Embodiments of the invention are not limited to two loads, but may be extended to any even multiple of serially connected loads. FIG. 2 is a block diagram of a dynamic voltage balancing circuit which illustrates the application of the principles of the invention to four serially connected loads each having a variable load impedance.

In the embodiment of the invention shown in FIG. 2 direct current source 20 supplies the direct current operating power for loads 21 through 24 which are connected in series across source 20. Each of the loads may continuously and individually change its load impedance, thereby constantly altering the current drain on the source. Loads 21 and 23, and loads 22 and 24 are individually paralleled by variable impedances 13 and 14, respectively, to provide a current bypass path for the individual loads. Variable impedances 13 and 14, which are identical to the variable impedances discussed in conjunction with FIG. 1, receive fixed reference voltages from a voltage divider network comprising resistors 25 through 28 connected in series across the D.C. source 20.

In the operation of the embodiment of the invention illustrated in FIG. 2 the bias voltage across each variable impedance is the voltage difference between the respective reference voltage and the voltage at the juncture of the corresponding loads. This bias voltage determines the impedance level and, therefore, the conductivity of the respective variable impedance similarly to the operation of the voltage balancing circuit of FIG. 1. As a result, each variable impedance bypasses past its particular associated load the excess current which results from load impedance changes, thereby maintaining the voltage across the loads at the predetermined ratio.

When, for instance, the total current drawn by loads 22, 23, and 24 and their respective parallel variable impedances exceeds the load current of load 21, the voltage at the juncture of loads 21 and 22 tends to rise. As a result, variable impedance 13 in parallel with load 21 becomes forward biased and starts to conduct to bypass the excess current past load 21. As the excess current varies, the conductivity of the respective variable impedance is automatically varied to accommodate the necessary current, thereby maintaining the voltage across load 21 constant.

In case the current requirements for several of the loads differ from each other, each of the particular variable impedances bypasses the excess current past its particular parallel load. As an example it may, for instance, be assumed that it is desired to have the source voltage divide evenly across loads 21 through 24, with loads 22 and 23 each having one-half of the load impedances of loads 21 and 24. Loads 22 and 23 are therefore required to carry twice the current of loads 21 and 24. The combination variable impedance 13 and its parallel load 21 as well as the combination of variable impedance 14 and its parallel load 24 are, therefore, required together to furnish the necessary current. Variable impedance 13 in parallel with load 21 and variable impedance 14 in parallel with load 24 consequently conduct sufficiently to produce together with loads 21 and 24, respectively, a current for loads 22 and 23 which is twice as high as the current through loads 21 and 24. However, variable impedances 14 and 13 in parallel with loads 22 and 23, respectively, are both cut off, since all of the current is required for loads 22 and 23 in order to maintain the predetermined voltage ratio across all of the loads.

It is to be understood that the above-described arrangements are illustrative of the application of the principles of the invention. Numerous other arrangements may be devised by those skilled in the art without departing from the spirit and scope of the invention.

What is claimed is:

1. A dynamic voltage balancing circuit to maintain the voltage ratio across at least two serially connected loads at a constant level in response to a direct voltage applied across said loads comprising at least two serially connected variable impedances connected in parallel with said loads and having their common point connected to the common point between said serially connected loads, and a voltage divider connected in parallel with said direct voltage and connected to furnish a reference voltage to said serially connected variable impedances to cause at least one of said impedances to vary its current carrying capacity in response to a current change through one of said loads, thereby maintaining the current through the other of said loads fixed and independent of said current change.

2. The dynamic voltage balancing circuit in accordance with claim 1 in which each of said variable impedances comprises a transistor having a base electrode, an emitter electrode, and a collector electrode, each of said transistors having its emitter-collector path connected in parallel with a respective load to provide a variable impedance path in parallel with said respective load, and each of said transistors having its base electrode connected to a voltage reference point on said voltage divider network to control the conductivity of said respective transistor.

3. The dynamic voltage balancing circuit in accordance with claim 1 in which a first one of said variable impedances comprises a transistor of one conductivity type and a second one of said variable impedances comprises a transistor of opposite conductivity type, said transistors each having a base electrode, a collector electrode, and an emitter electrode, said transistors having their respective emitter electrodes connected together and to the common point between said serially connected loads, said transistors of said first and second impedances having their respective collector electrodes connected to the end terminal of one and another of said serially connected loads, respectively, and said transistors having their respective base electrodes connected together and to a reference point on said voltage divider network, whereby the reference voltage of said divider network determines the voltage ratio across said serially connected loads.

4. A dynamic voltage balancing circuit in accordance with claim 3 in which each of said impedances includes in addition a second transistor of the same conductivity type as a respective first transistor, each of said second transistors having a base electrode, an emitter electrode, and a collector electrode, said collector electrodes of respective first and second transistors being connected together, said emitter electrode of a respective second transistor being connected to the base electrode of a corresponding respective first transistor, and said base electrodes of said second transistors being connected together and to the reference point on said divider network, whereby the emitter-base path of said second transistor is being connected between the base electrode of a respective corresponding first transistor and the reference point on said voltage divider network to increase the stability of said dynamic voltage balancing circuit.

References Cited

UNITED STATES PATENTS

| | | | |
|---|---|---|---|
| 1,404,799 | 1/1922 | Shackleton | 307—15 |
| 1,835,121 | 12/1931 | Rentschler | 307—15 |
| 2,859,402 | 11/1959 | Schaeve | 323—65 |
| 3,018,433 | 1/1962 | Stone | 323—23 X |

ROBERT K. SCHAEFER, Primary Examiner

H. J. HOHAUSER, Assistant Examiner

U.S. Cl. X.R.

307—15; 323—22